United States Patent Office 3,483,764
Patented Dec. 16, 1969

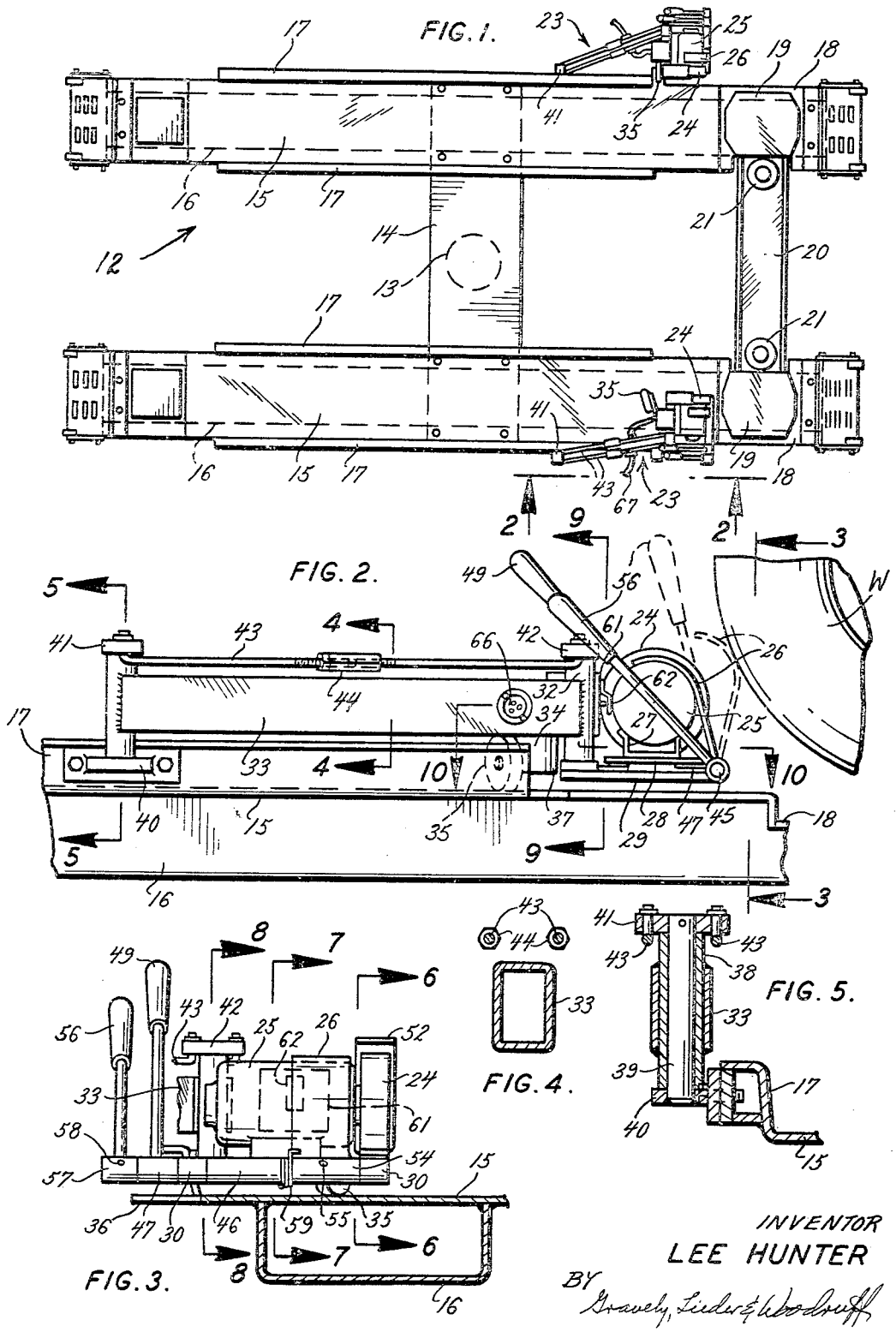

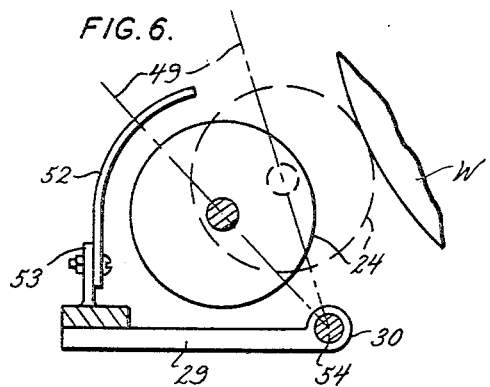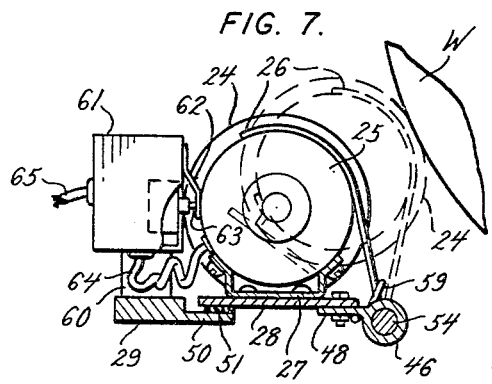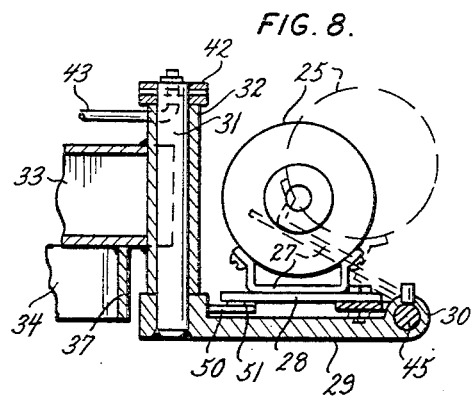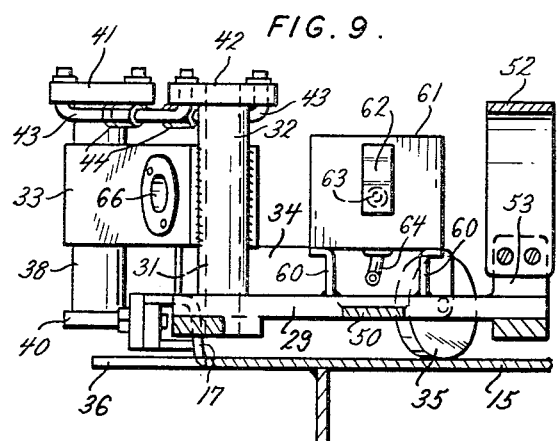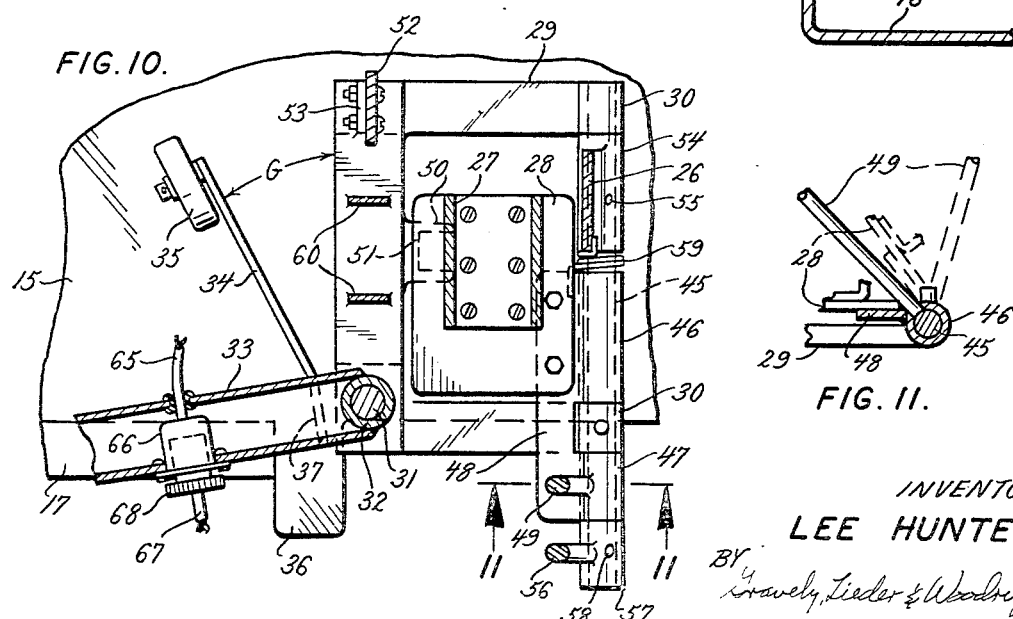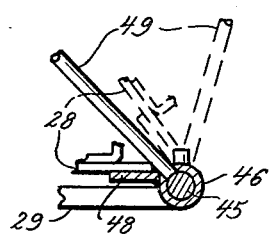

3,483,764
VEHICLE WHEEL SPINNER ASSEMBLY
Lee Hunter, Ladue, Mo.
(13501 Ladue Road, St. Louis County, Mo. 63141)
Filed July 24, 1968, Ser. No. 747,306
Int. Cl. F16m *13/00;* G01m *1/06*
U.S. Cl. 74—16
10 Claims

ABSTRACT OF THE DISCLOSURE

A wheel spinner assembly adapted for vehicle wheels and including support means for mounting the spinner assembly so that it may be retracted and moved into operating position without losing its desired alignment with a vehicle wheel tread. The spinner assembly is also suitable for mounting on the rack so it may be vertically adjusted by the rack to an elevation where the service attendant can better perform the wheel spinning operation for wheel balancing and other purposes.

---

The present invention is particularly directed to improvements in wheel spinning assemblies for vehicles.

Wheel spinning equipment of various designs and modes of operation are available at the present time as separate units, and as such are usually utilized from floor position. This is unhandy for the operator and often times causes errors to arise in the results desired. It is also usual to find that wheel spinners are portable so as to be movable into operating position with the tire, and the care used in this operation is not always that which is recommended. There are other similar problems with wheel spinners, and it is an important object of this invention to overcome these problems and to do it with simple and positive means.

Another object of this invention is to provide a wheel spinner assembly that can be carried on a vehicle service rack for operation at a convenient elevation selected by raising the rack.

It is also an object of this invention to provide a novel arrangement for operatively mounting the wheel spinner such that it may be easily moved out of the wheel track when placing a vehicle and then moved into proper alignment with the wheel for achieving optimum results.

A further object of this invention is to provide wheel spinner assemblies at both wheel tracks so that it does not become necessary to move the assembly from wheel to wheel to perform the spinning operation.

These and further objects of this invention will be set forth in greater detail in the following specification of a preferred embodiment.

The wheel spinner assembly herein preferred includes a motor driven wheel spinner and manual brake unit, a swing arm connected to the floor or to a service rack and directing the unit for movement into and out of alignment with the wheel, and roller means to assist the swing arm in the movement of the unit. The preferred assembly also includes the components and sub-assemblies to be hereinafter described and claimed.

In the accompanying drawings:

FIG. 1 is a plan view of a vehicle service rack equipped with a pair of wheel spinner units of the preferred character to be described hereinafter, one being in retracted position and one being in operative position;

FIG. 2 is a fragmentary elevational view of the service rack showing one of the preferred wheel spinner unit, as seen at line 2—2 in FIG. 1;

FIG. 3 is an end elevational view of the preferred unit on a fragmentary sectional view of the service rack;

FIG. 4 is a fragmentary sectional view of the swing arm as seen at line 4—4 in FIG. 2;

FIG. 5 is a fragmentary sectional view of the pivot post for the swing arm as seen at line 5—5 in FIG. 2;

FIG. 6 is a fragmentary sectional and schematic view of the wheel spinner in its various positions of operative movement in relation to a wheel, the view being taken at line 6—6 in FIG. 3;

FIG. 7 is a detailed view of a wheel spinner assembly, parts thereof being seen in section at line 7—7 in FIG. 3;

FIG. 8 is a further sectional view of the spinner unit taken at line 8—8 in FIG. 3;

FIG. 9 is an elevational and partly sectional view of the wheel spinner frame, swing arm and supporting roller, the view being taken at line 9—9 in FIG. 2;

FIG. 10 is a partly sectional plan view of the frame and swing arm for the wheel spinner as seen at line 10—10 in FIG. 2; and FIG. 11 is a fragmentary sectional view of the control means associated with the spinner unit, this view being seen at line 11—11 in FIG. 10.

In FIG. 1 the improved wheel spinner assembly is mounted on vehicle service rack 12 having a central hoist ram 13 operated in the usual manner from a cylinder mounted below the surface of the service shop floor. The upper end of the ram 13 carries a load carrying beam 14 and on the opposite ends thereof are secured the vehicle wheel tracks which include heavy gauge plates 15 (FIG. 3) supported on reinforcing channel members 16 turned with the flanges up and suitably secured to the underside of the track plates 15. The sides of each track are provided with guide flanges 17.

At the common ends of each wheel track 15 a depressed section 18 is formed to receive a wheel turn plate assembly 19 on which the wheels of a vehicle may be spotted. Between the turn plates 19 and the respective tracks 15, a suitable support member 20 is disposed to carry a pair of lift jacks 21 which engage selected lift points in the underframe of a vehicle and raise it so the wheels W (FIG. 2) can be elevated for spinning or for other purposes.

The spinner assembly units 23 are generally shown in operating and retracted positions on the lift rack 12 in FIG. 1. The details of a representative unit 23 will be described in other views of the drawings, particular reference being directed to FIGS. 2, 3, 9 and 10. It is not necessary to describe both units 23 as each is similar, except for certain right and left-hand components. It is understood that the assembly units 23 can be mounted directly on the shop floor or to the tracks 15 which can be fixed to the floor instead of being movable as above indicated.

Each preferred unit 23 includes a driving wheel 24 driven by motor 25. Closely adjacent the wheel 24 is a brake shoe 26 which is movable independently when desired (broken line in FIG. 2) to stop tire rotation. The shoe 26 is also movable with the driving wheel 24 and its motor 25 when spinning the vehicle wheel W (broken line view in FIG. 7). The motor 25 is supported by a suitable bracket 27 upon a carriage 28 (FIG. 10) which is pivoted on a frame structure 29. The frame structure 29 is provided with a pair of bearing housings 30 (FIG. 10). Near one corner of the frame 29 a vertical pivot post 31 is attached in order to receive a pivot sleeve bearing 32 (FIG. 8). The sleeve bearing 32 is firmly connected to one end of a box swing arm or beam 33 (FIGS. 2, 4 and 8). The sleeve bearing 32 is suitably elongated to sustain the frame 29 and the components mounted thereon in substantially horizontal position spaced above the track-plate 15 (FIG. 9). Auxiliary support arm 34 is connected to the box beam 33 adjacent the post 31 and the arm extends angularly out over the track-plate 15 to carry a roller 35 which rides on the track-plate 15 when the unit 23 is in operating position (FIG. 1). When the unit 23 is retracted the roller 35 moves out of the track to clear the same for the passage of a vehicle wheel. In the case of the track 15, a plate extension 36 may be integral with the track-plate 15 (FIG. 10). The operating position of unit 23 is assured by the engagement of the inner end 37 of the support arm 34 with an adjacent portion of the frame structure 29 if the unit is moved too far across the vehicle travel line or too close to the inner margin of the track 15.

The box swing beam 33 has its outer end (FIG. 5) secured to a pivot sleeve 38, and this sleeve is pivoted on a post 39 which is carried by bracket means 40 attached to a part of the wheel guide flange 17 for the track-plates 15, but the post 39 may be supported from the shop floor (not shown). Thus, one end of the swing arm 33 is pivoted on a fixed post 39 and its other end pivotally controls and supports the wheel spinner unit 23. Alignment of the unit 23 is obtained by the arrangement of an alignment selector 41 connected to the pivot pin 39 (FIGS. 5 and 9) so it is substantially fixed in whatever position is selected. An alignment follower 42 is connected to the pivot pin 31 (FIG. 8) which is fixed in the frame 29. The selector 41 and follower 42 are connected together by coordinating rod means 43 having turnbuckles 44 included therein for adjusting the tension and length of each rod means. The opposite ends of rod means 43 are engaged in the selector 41 and follower 42 as is clearly seen in FIG. 9. The operation of the alignment selector is determined by setting the position of the selector 41 and then adjusting the turnbuckles 44 so that the rod means 43 will cause the follower 42 to swing the frame 29 in a path which keeps the axis of rotation of the motor driven wheel 24 substantially parallel to the axis of rotation of the wheel W.

The frame 29, as noted above, is provided with spaced bearing housings 30 which operatively support a pivot shaft 45 (FIG. 10), and this shaft carries the carriage 28 for the motor 25 by means of spaced bearing sleeves 46 and 47 which are interconnected by a plate 48. The plate is attached to the motor carriage 28 and an actuating lever 49 is connected to the bearing sleeve 47. When in the retracted position (FIGS. 7 and 10) the motor carriage 28 is supported on a stop lip 50 having a noise suppressing pad 51 thereon. The weight of the motor 25 keeps the carriage 28 on the stop lip 50 so that a force is required on lever 49 to pivot the motor into operative position (FIGS. 6, 7, 8 and 11). A guard 52 is mounted on a bracket 53 (FIGS. 3, 6, 9 and 10) carried by the frame 29 at a position aligned with the wheel spinner driving wheel 24, the guard being curved up and over the wheel.

Referring again to FIGS. 2, 3, 7 and 10, the assembly includes the wheel braking shoe 26 which is provided with a bearing sleeve 54 operatively mounted on the pivot shaft 45 by a suitable pin 55 (FIG. 10). A brake shoe operating lever 56 is mounted by a sleeve 57 and pin 58 on the outer end of the shaft 45. A suitable torsion spring 59 is positioned adjacent sleeve 54 to bias the brake shoe 26 into retracted position (FIG. 7) against the motor 25, the shoe 26 being suitably curved to present a clean surface to the wheel W when moved by lever 56 against the force of the spring 59. The mounting of the brake shoe 26 is such that it moves with pivoting of the motor 25 but the spring 59 prevents the shoe 26 engaging the wheel W until the shoe lever 56 is actuated. Thus, actuation of lever 49 to pivot the carriage 28 will move the motor 25 and drive wheel 24 along with the brake shoe 26.

The frame 29 is provided with a pair of brackets 60 which support a control switch in box 61 (FIGS. 3, 7, 9 and 10) in position opposite the motor 25 such that a spring leaf 62 is engaged thereby to depress the leaf and actuate a switch control arm 63. The switch in the box 61 is normally held in open circuit position when the motor 25 is in its retracted position as seen in full line in FIG. 7, but when the motor is pivoted into wheel driving position (broken line of FIG. 7) the leaf 62 allows the switch to close and energize the motor 25. Current is supplied by an electric cable 64, and current is brought into the box 61 by a cable 65 (FIG. 7). The current input cable 65 (FIG. 10) leads to a receptacle box 66 mounted in arm 33, and a cable 67 and plug 68 connect into the receptacle in known manner.

The operation of the unit 23 is suggested in FIGS. 1 and 2. With the units 23 moved on swing arms 33 into non-operative positions, such as with the rollers 35 on the extensions 26, a vehicle may be run onto the tracks 15 and the wheels W thereof spotted on the plates 19. The wheels are jacked up by jacks 21 so as to be free to rotate, and a unit 23 is swung into operating position. The coordinating rod means 43 maintains the proper alignment of the drive wheel 24 with wheel W. The lever 49 is grasped and moved toward the wheel W to close the switch in box 61 and energize motor 25. Pressure on lever 49 will cause the drive wheel 24 to bear upon the vehicle wheel W and rotate the same up to any desired speed. When the wheel W needs to be stopped the lever 49 is brought back to its starting position by the weight effect of the motor 25 on carriage 28, thus cutting off the current supply. Next the lever 56 is swung to bring the brake shoe 26 into contact with the wheel W for stopping its rotation. After wheel rotation operations are completed, the unit 23 is moved into its retracted position. Both units 23 operate in like manner, but one is righthanded and one lefthanded. In each case, control movement of levers 49 and 56 is toward and away from the wheel W to be driven. It is, of course, most convenient to have the tracks 15 as portions of a lift rack.

It should now be clearly apparent in what manner the units 23 are intended to be operated so as to carry out the purposes thereof. Mounting the units 23 upon the lift rack 12 will allow positioning the units at a desired elevation so that the attendant may more conveniently and accurately utilize the same. Should alignment of the driving wheel 24 be required at any time, the alignment selector 41 may be re-set or the rod means may be selectively lengthened or shortened by the turnbuckles 44. Location of the units 23 in operating positions is obtained by engagement of the stop 37 against the frame 29 as indicated in FIG. 10. In its retracted position the roller arm 34 engages the frame 29 because the frame 29 is caused to swing about the axis of the post 31 in a counterclockwise direction (FIG. 10) as the swing arm 33 moves in a clockwise direction about its pivot 39. This motion results in closing the gap G between arm 34 and the frame 29 at the position when the roller 35 reaches the extension 36.

While certain preferred embodiments of the vehicle wheel spinner assembly have been described in the foregoing specification, it is understood that changes and modifications therein are to be included within the scope of the appended claims.

What is claimed is:

1. The combination of a wheel spinning unit having a motor driven wheel for engaging and spinning a vehicle wheel, and swing arm means pivotally mounting said unit on a support for movement between a spinning position aligned with a wheel and a retracted position adjacent one side of the wheel.

2. The combination of claim 1 characterized in that said swing arm means maintains said unit aligned with the wheel, auxiliary support arm means is connected to said unit, and roller means is carried by auxiliary arm means, said auxiliary arm means being positioned to stop said unit in its retracted position.

3. The combination of claim 1 characterized in that said unit includes a frame carried by said swing arm and a carriage pivotally mounted on said frame, said motor driven wheel being attached to said carriage.

4. The combination of claim 3 characterized in that said swing arm and frame move in a horizontal plane, said carriage and motor driven wheel moves in a vertical plane toward and away from the vehicle wheel, and alignment selector means is operatively connected to said carriage to adjust the alignment of said carriage to the vehicle wheel.

5. A vehicle wheel spinner assembly comprising a wheel supporting track for a vehicle, means connected to said track to elevate the track, an elongated swing arm means pivotally connected adjacent one end to said track to move about a substantially vertical pivot axis, a frame pivotally connected to the opposite end portion of said swing arm means to move about a substantially vertical axis, said swing arm means moving said frame between a first position at one side of said track and a second position aligned with said track, motor driven wheel spinner means mounted on said frame to move relative to said frame in directions toward and away from engaging a vehicle wheel, said spinner means moving about an axis substantially parallel to the vehicle wheel axis, and alignment selector means operatively connected between said swing arm pivot connection to said track and said frame pivot connection to said swing arm means to maintain said frame in a position to retain said parallelism of said spinner means axis and the vehicle wheel axis.

6. The assembly of claim 5 characterized in that an auxiliary arm means is connected to said swing arm means in position angularly related to said frame with said frame in position over said track, said auxiliary arm means engaging said frame to stop said frame in said first position.

7. The assembly of claim 5 characterized in that jack means is provided adjacent said second position of said frame, said jack means being operable to elevate the vehicle during wheel spinning.

8. A vehicle wheel spinner unit comprising a supporting frame, a carriage pivoted on said frame for movement into a wheel spinning position raised angularly off said frame and a retracted position on said frame, a motor mounted on said carriage at one side of the axis of pivoting of said carriage, a vehicle wheel spinning wheel connected to said motor, a vehicle wheel braking shoe pivotally mounted on said carriage to swing about a pivot axis from a retracted position to an extended vehicle wheel braking position, said braking shoe moving with said carriage into its raised angular position while retaining its retracted position relative to the vehicle wheel and moving independently of said carriage into its braking position.

9. The spinner unit of claim 8 and including motor control switch means mounted on said frame adjacent said motor position with said carriage on said frame, said switch means being held in motor-off position by said motor and being freed to energize said motor with movement of said carriage to angularly raised position.

10. The spinner unit of claim 8 and including a first lever connected to said carriage to pivot the same into said raised angular position, second lever means connected to said braking shoe to swing said shoe into vehicle wheel braking position, and yieldable means connected to said braking shoe and normally retaining said shoe in retracted position.

References Cited

UNITED STATES PATENTS

| 2,700,892 | 2/1955 | Lowe | 73—457 |
| 2,722,829 | 11/1955 | Ringering | 73—457 |
| 2,557,867 | 6/1951 | Forster | 74—16 |
| 3,071,221 | 1/1963 | Hosking | 74—16 |

FRED C. MATTERN, Jr., Primary Examiner

F. D. SHOEMAKER, Assistant Examiner

U.S. Cl. X.R.

60—52; 73—457